(12) United States Patent
Zhong et al.

(10) Patent No.: US 12,424,865 B2
(45) Date of Patent: Sep. 23, 2025

(54) METHOD FOR CONTROLLING BATTERY PACK IN HYBRID ENERGY STORAGE STATE BASED ON LIGHT INTENSITY

(71) Applicant: National Engineering Research Center of Advanced Energy Storage Materials (Shenzhen) Co., Ltd, Shenzhen (CN)

(72) Inventors: Faping Zhong, Shenzhen (CN); Mingxing Tang, Shenzhen (CN); Peihong Zhao, Shenzhen (CN)

(73) Assignee: National Engineering Research Center of Advanced Energy Storage Materials (Shenzhen) Co., Ltd, Shenzhen (CN)

( * ) Notice: Subject to any disclaimer, the term of this patent is extended or adjusted under 35 U.S.C. 154(b) by 0 days.

(21) Appl. No.: 18/557,028

(22) PCT Filed: Sep. 6, 2023

(86) PCT No.: PCT/CN2023/117230
§ 371 (c)(1),
(2) Date: Oct. 24, 2023

(87) PCT Pub. No.: WO2024/169166
PCT Pub. Date: Aug. 22, 2024

(65) Prior Publication Data
US 2025/0088022 A1    Mar. 13, 2025

(30) Foreign Application Priority Data
Feb. 17, 2023    (CN) .......................... 202310131423.6

(51) Int. Cl.
*H02J 7/00* (2006.01)
*G06T 7/90* (2017.01)
(Continued)

(52) U.S. Cl.
CPC ............ *H02J 7/00712* (2020.01); *G06T 7/90* (2017.01); *H01M 10/441* (2013.01); *H02J 3/32* (2013.01);
(Continued)

(58) Field of Classification Search
CPC .................................................. H02J 7/00712
See application file for complete search history.

(56) References Cited

FOREIGN PATENT DOCUMENTS

| CN | 110120679 A | 8/2019 |
|---|---|---|
| CN | 110649659 A | 1/2020 |

(Continued)

OTHER PUBLICATIONS

PCT/CN2023/117230—International Search Report and Written Opinion mailed on Nov. 7, 2023, 24 pages.

(Continued)

*Primary Examiner* — Adi Amrany
(74) *Attorney, Agent, or Firm* — Getech Law LLC; Jun Ye

(57) ABSTRACT

The invention discloses a battery pack control method in a mixed storage state based on light intensity, which includes S1: detecting the status of multiple energy storage battery packs in real time. When it is in the standby state, it goes to S2. When it is in the charging state, it goes to S3, when it is in the discharge state, go to S4, when it is in the simultaneous charge-discharge state, go to S5; S2: When it is in the standby state: detect the lighting situation, and compare the structure with the current light intensity coefficient value and the set threshold. Adjust the circuit parameters; S3: Work in Buck mode when charging; S4: Work in Boost mode when discharging; S5: When in charge-discharge state, proceed according to the output-input power difference. Adjustment; S6: Return to S1 and cycle through multi-energy storage battery control.

12 Claims, 8 Drawing Sheets

(51) Int. Cl.
*H01M 10/44* (2006.01)
*H02J 3/32* (2006.01)
*H02J 3/38* (2006.01)
*H02J 7/35* (2006.01)

(52) U.S. Cl.
CPC ............ *H02J 3/38* (2013.01); *H02J 7/00047* (2020.01); *H02J 7/0013* (2013.01); *H02J 7/0047* (2013.01); *H02J 7/35* (2013.01); *G06T 2207/10024* (2013.01); *H02J 2207/20* (2020.01); *H02J 2300/24* (2020.01)

(56)  References Cited

FOREIGN PATENT DOCUMENTS

| | | |
|---|---|---|
| CN | 111200300 A | 5/2020 |
| CN | 116247707 A | 6/2023 |

OTHER PUBLICATIONS

PCT/CN2023/117230—International Search Report and Written Opinion mailed on Nov. 7, 2023, 17 pages.

METHOD FOR CONTROLLING BATTERY PACK IN HYBRID ENERGY STORAGE STATE BASED ON LIGHT INTENSITY

CROSS REFERENCE OF RELATED APPLICATION

The present application is a 371 of international Application PCT/CN2023/117230, filed Sep. 6, 2023, which claims priority to Chinese Patent Application No. 202310131423.6 filed Feb. 17, 2023. The contents of the applications are incorporated herein by reference in their entireties.

TECHNICAL FIELD

The present invention relates to the technical field of battery pack control, and in particular to a battery pack control method in a mixed storage state based on light intensity of the battery.

BACKGROUND

With the advancement of smart grid construction planning, solar energy, as an ideal renewable energy source, has increasingly broad application prospects. The main way to develop and utilize solar energy is photovoltaic power generation. Its advantages include no noise, no pollution, energy is available everywhere and inexhaustible, is not subject to geographical restrictions, can be unattended, has a short construction period, and has great freedom in scale design. Photovoltaic There are two ways of power generation: off-grid independent power supply and grid-connected power supply. In the past, due to the high production costs of photovoltaic cells, photovoltaic power generation was mostly used in remote areas without electricity, and was mostly used by off-grid users such as small and medium-sized systems. However, in recent years, the photovoltaic industry and its market have undergone great changes, and have begun to move rapidly towards urban grid-connected power generation, new energy vehicles, and photovoltaic building integration.

There are some control methods for multiple energy storage battery packs based on weather changes in the existing technology, but these methods do not perform real-time detection and adaptive adjustment for each state of the hybrid energy storage battery, and do not involve circuit control based on lighting conditions. The regulation of power supply and the judgment of light detection generally use photoresistor, but the detection accuracy is low. For example, in weather with low light intensity but strong ultraviolet rays, the light intensity is more affected by light shadows, etc., and there is no basis for energy storage. The circuit that adjusts the state of charge SOC and maximum charging capacity SOP given by the battery pack BMS at this time results in low automatic adaptability.

SUMMARY

In view of the above-mentioned problems mentioned in the prior art, in order to solve the above-mentioned technical problems, the present invention provides a battery pack control method in a mixed storage state based on light intensity of the battery. The present invention is used for hybrid energy storage batteries. The circuits of the present invention are connected in parallel. It is suitable for multiple battery types to be connected in parallel but can operate independently, including steps:

S1: detecting a status of multiple energy storage battery packs in real time wherein, if the status of multiple energy storage battery packs is in a standby state, go to S2;

wherein, if the status of multiple energy storage battery packs is in a charging state, go to S3;

wherein, if the status of multiple energy storage battery packs is in a discharge state, go to S4;

wherein, if the status of multiple energy storage battery packs is in a simultaneous charge-discharge state, go to S5;

S2: detecting a lighting situation by calculating a light intensity coefficient value and a set threshold, and determining whether a PV photovoltaic power generation power supply is working, and adjusting a DC side standby voltage of a DC-AC inverter device PCS, wherein after S2, go to S6;

S3: sending, via a control unit, a control signal PWM for forward charging control a IGBT T-ci through an IGBT controller, and dynamically adjusting and suppressing a charging power by adjusting a duty cycle, wherein after S3, go to S6;

S4: sending, via the control unit, the duty cycle corresponding to the control signal PWM for discharging control a IGBT T-d through the IGBT controller, and dynamically adjusting the DC side of the DC-AC inverter device PCS, wherein after S4, go to S6;

S5: based on the size of an output power Po and an input power Pi, adjusting the charging or discharging of an energy storage battery pack BAT, wherein after S5, go to S6;

S6: returning to S1.

Preferably, a battery pack control method in a mixed storage state based on light intensity according to claim 1, characterized in that detecting the lighting situation in S2 further comprises calculating the light intensity coefficient value through the color of a RGB image of the energy storage battery pack BAT in real time, wherein the light intensity coefficient value is expressed as:

$$\gamma = k_1 R + k_2 G + k_3 B$$

R is the R channel value of the RGB image acquired by the CCD camera, G is the G channel value of the RGB image acquired by the CCD camera, B is the B channel value of the RGB image acquired by the CCD camera, and $k_1$, $k_2$, $k_3$ represent the weight coefficient of the R, G, B channel value. The larger the light intensity coefficient value, the stronger the light intensity.

Preferably, the weight coefficients of the R channel value, G channel value, and B channel value are all 0.33 or 255.

Preferably, after step S5, it also includes: when the voltage Vi of the input port of the DC power supply is greater than the voltage Vo of the output port of the DC adjustment power supply, and if the output power Po is less than the input power Pi at this time, the input-output direct connection is The reverse isolation diode D4 will be in a critical conduction state, and the electric energy will be directly supplied to the DC-AC inverter device PCS. The remaining PV photovoltaic power supply will be absorbed by the energy storage battery pack BAT, but the no-load peak voltage of the PV photovoltaic power supply should be controlled. Within the voltage range set on the DC side of the DC-AC inverter device PCS; when the output power Po is greater than the input power Pi, due to the boosting effect of the discharge circuit, the input-output direct and reverse isolation diode D4 is cut off, and the energy storage battery Group BAT participates in charge-discharge and buffers changes in electrical energy.

Preferably, after step S5, it also includes when the external power grid power consumption is less than the set threshold and there is no PV photovoltaic power generation at this time, according to the capacity state SOC of the energy storage battery group, the IGBT controller starts the reverse charging control IGBT T-co works, absorbing and storing electric energy from the power grid through the DC-AC inverter device PCS reverse rectification circuit to improve energy storage.

Preferably, in step S2, when the multiple energy storage battery groups are in standby state, the forward charge control IGBT T-ci, the discharge control IGBT T-d and the reverse charge control IGBT T-co stop working.

Preferably, the gates of the forward charge control IGBT T-ci, the discharge control IGBT T-d and the reverse charge control IGBT T-co are respectively connected to corresponding IGBT controllers.

Preferably, the step S5: when the state type of the multiple energy storage battery groups is the simultaneous charge-discharge state: that is, when the PV photovoltaic power source generates power normally and the DC-AC inverter PCS outputs power to the power grid and works at the same time, The control unit detects the voltage Vi and current Ii of the DC power supply input port and the voltage Vo and current Io data of the DC adjustment power supply output port as well as the charge-discharge capacity parameters uploaded by the battery management system BMS of the energy storage battery pack. According to the output—The input electric energy difference is $\Delta P=Po-Pi$. At the same time, the duty cycle of the control signal PWM of the forward charging control IGBT T-ci and the discharge control IGBT T-d is adjusted. When the output power Po is greater than the input power Pi, the energy storage battery pack BAT Participate in discharge. When the output power Po is less than the input power Pi, the energy storage battery pack BAT is charged. When the output power Po is equal to the input power Pi, the energy storage battery pack BAT works in a critical state to perform voltage clamping and dynamic energy compensation.

Preferably, the step S4: when the state type of the multiple energy storage battery packs is the discharge state: the discharge control IGBT T-d, the discharge energy storage inductor Ld, and the discharge freewheeling diode D2 work in the Boost boost mode, and the control unit detects After adjusting the changes in voltage Vo and current Io at the DC power output port, according to the current load power demand of the DC-AC inverter device PCS and the maximum discharge capacity SOP2 given by the battery management system BMS of the energy storage battery pack at this time, The duty cycle corresponding to the control signal PWM for discharging control IGBT T-d is sent by the control unit through the IGBT controller and is dynamically adjusted to meet the energy input requirements of the DC side of the DC-AC inverter device PCS within the maximum power threshold range of the system.

Preferably, the step S3: when the state type of the multiple energy storage battery packs is the charging state: the forward charging control IGBT T-ci, the charging energy storage inductor Lc, and the charging freewheeling diode D1 work in Buck step-down mode, After the control unit detects changes in the voltage Vi and current Ii of the DC power supply input port, the control unit issues forward charging control through the IGBT controller based on the state of charge SOC and maximum charging capacity SOP1 detected by the energy storage battery pack BMS. The control signal PWM of IGBT T-ci dynamically adjusts and suppresses the charging power by adjusting its duty cycle.

Preferably, step S2: When the light intensity coefficient value is less than the set threshold or when no PV photovoltaic power generation source is working, the DC side standby voltage of the DC-AC inverter device PCS is equal to the battery pack voltage, that is, Vout=Vbat; if the light intensity When the intensity coefficient value is greater than the set threshold and the PV photovoltaic power generation power generation is normal, the DC-AC inverter device PCS is passed through the input-output pass-through and reverse isolation diode D4, and the PCS DC side standby voltage is equal to the photovoltaic power generation power supply voltage, that is, Vout=Vin.

Preferably, the maximum charging capacity SOP1 or/and the maximum discharging capacity SOP2 is obtained in the following manner. Step S71 selects multiple energy storage battery groups and detects their values at different temperatures, polarization voltages, durations, SOC, and SOH; step S72: Perform constant voltage discharge on multiple energy storage battery packs, record the constant voltage UcL and the current of the battery at the end of discharge in each charge state; Step S73: Perform constant voltage charging of the battery, record the constant voltage UcW and the battery in each charge state The current at the end of charging; Step S74: Perform constant power discharge on the battery, and determine the maximum discharge power of the battery under different charge states; Step S75: Perform constant power charging on the battery, and determine and obtain the maximum charging power of the battery under different charge states. Input the parameters in steps S71, S72, S73, S74, and S75 into the convolutional neural network training to obtain the convolutional neural network model of the training number, and input the status of the current energy storage battery pack into the trained convolutional neural network model, Obtain the maximum charging capacity SOP1 and the maximum discharging capacity SOP2.

The present invention provides a battery pack control method in a mixed storage state based on light intensity. The beneficial technical effects that can be achieved are as follows:

1. Make adaptive adjustments based on the detected lighting conditions; when the light intensity coefficient value is less than the set threshold or when there is no PV photovoltaic power supply working, the light intensity coefficient value is judged based on the color of the image, which greatly improves the accuracy of the judgment.

2. According to the state of charge SOC and maximum charging capacity SOP1 detected by the BMS of the energy storage battery pack, the control unit sends the control signal PWM for forward charging control IGBT T-ci through the IGBT controller, and dynamically adjusts it by adjusting its duty cycle, suppress the charging power, so that the battery pack can collect and store new energy safely, stably, quickly and efficiently.

3. The maximum charging capacity SOP1 and the maximum discharging capacity SOP2 are obtained by training the convolutional neural network algorithm based on historical data, which greatly improves the accuracy.

4. According to the output-input power difference, that is, $\Delta P=Po-Pi$, adjust the duty cycle of the control signal PWM of the forward charging control IGBT T-ci and the discharge control IGBT T-d at the same time. When the output power Po is greater than the input power Pi, The energy storage battery pack BAT participates in discharging. When the output power Po is less than the input power Pi, the energy storage battery pack BAT charges. When the output power Po is equal to the input power Pi, the energy storage battery pack BAT works in a critical state, realizing voltage clamping. Bit and dynamic energy compensation improves the power control adaptive capability.

5. The present invention is used for hybrid energy storage batteries. The circuit of the present invention is suitable for parallel connection of multiple battery types and different types of battery packs, and participates in system adjustment separately or independently according to their different characteristics, giving full play to their different battery advantages.

BRIEF DESCRIPTION OF THE DRAWINGS

In order to explain the embodiments of the present invention or the technical solutions in the prior art more clearly, the drawings needed to be used in the description of the embodiments or the prior art will be briefly introduced below.

Obviously, the drawings in the following description are only These are some embodiments of the present invention. For those of ordinary skill in the art, other drawings can be obtained based on these drawings without exerting creative efforts.

DETAILED DESCRIPTION

The technical solutions in the embodiments of the present invention will be clearly and completely described below with reference to the accompanying drawings in the embodiments of the present invention. Obviously, the described embodiments are only some of the embodiments of the present invention, rather than all the embodiments. Based on the embodiments of the present invention, all other embodiments obtained by those of ordinary skill in the art without making creative efforts fall within the scope of protection of the present invention.

Example 1

Figure 1:
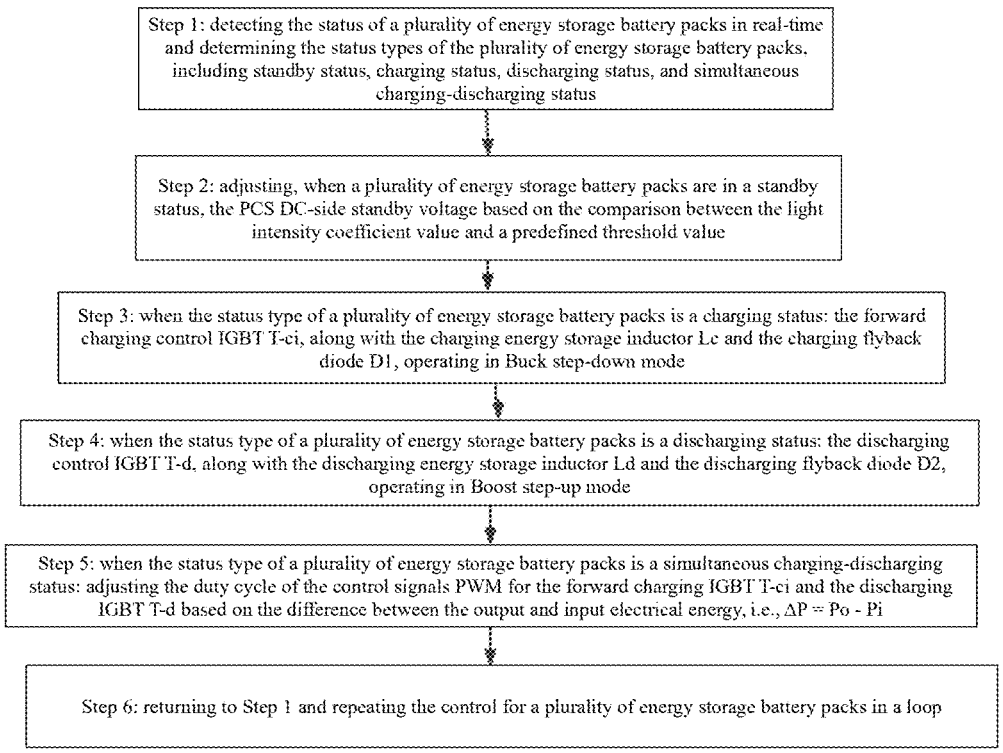
FIG. 1 is a schematic diagram of the steps of a battery pack control method in a mixed storage state based on light intensity according to the present invention.
Figure 2:
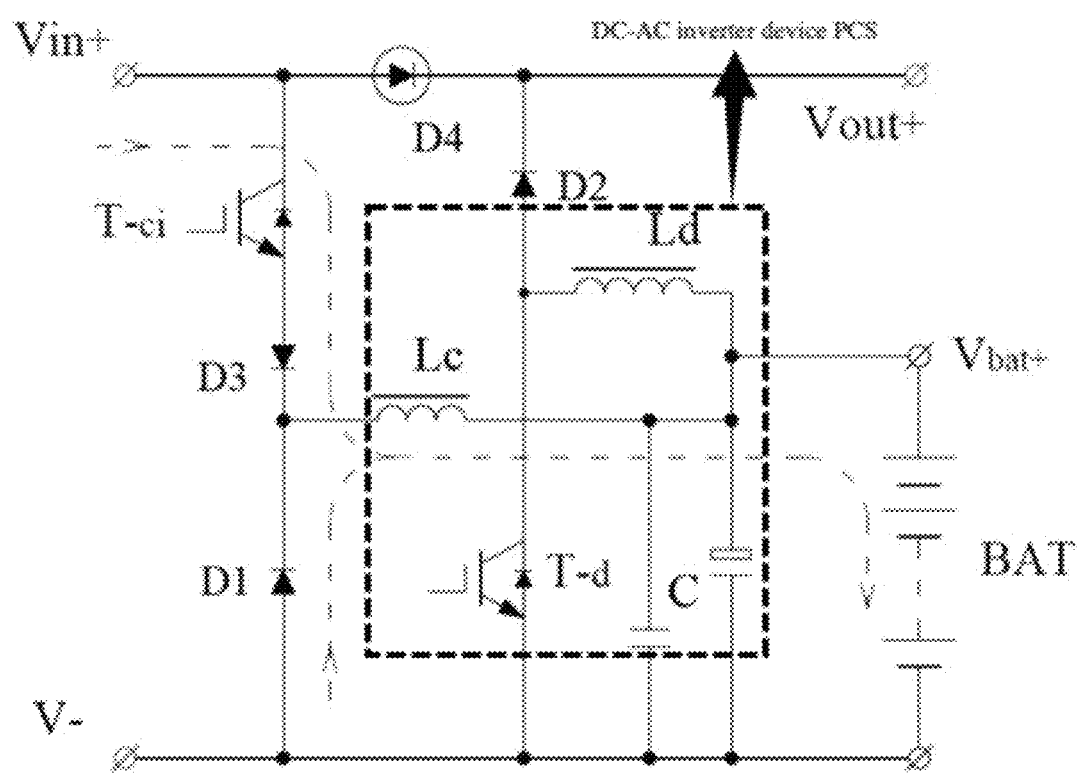
FIG. 2 is a forward independent charging state diagram of the input side of the DC power conversion device based on the battery pack control method based on light intensity and battery status.

Compared with traditional new energy power generation systems, embodiments of the present invention provide a battery pack control method in a mixed storage state based on light intensity, as shown in FIG. 1, which includes the steps:

Step S1: Detect the status of multiple energy storage battery packs in real time, and determine the status types of multiple energy storage battery packs, including standby state, charging state, discharging state, and simultaneous charge-discharge;

Step S2: When multiple energy storage battery packs are in standby state: detect the light situation; when the light intensity coefficient value is less than the set threshold or when no PV photovoltaic power source is working, the DC side standby voltage of the DC-AC inverter device PCS is equal to Battery pack voltage, that is, Vout=Vbat; if the light intensity coefficient value is greater than the set threshold and the PV photovoltaic power source generates electricity normally, at this time, the DC-AC inverter PCS, PCS is passed through the input-output pass-through and reverse isolation diode D4. The DC side standby voltage is equal to the photovoltaic power supply voltage, that is, Vout=Vin;

Step S3: When the state type of multiple energy storage battery packs is charging state: FIG. 2 shows the forward independent charging state diagram of the input side of the DC power conversion device; forward charging control IGBT T-ci and charging energy storage The inductor Lc and the charging freewheeling diode D1 work in Buck step-down mode. After the control unit detects the changes in the voltage Vi and current Ii of the DC power supply input port, it detects the state of charge SOC and maximum charge based on the BMS of the energy storage battery pack. Capability SOP1, the control unit sends the control signal PWM for forward charging control IGBT T-ci through the IGBT controller, and dynamically adjusts and suppresses the charging power by adjusting its duty cycle, so that the battery pack can collect and store new energy safely, stably, quickly and efficiently. energy;

Step S4: When the status type of multiple energy storage battery packs is the discharge state: the discharge control IGBT T-d, the discharge storage inductor Ld, and the discharge freewheeling diode D2 work in the Boost boost mode, and the control unit detects the DC adjustment power output After the voltage Vo and current Io of the port change, according to the load power demand of the DC-AC inverter device PCS at this time, the demand is determined based on the load resistance and load task requirements. The specific load power demand can also be customized. This The maximum discharge capacity SOP2 given by the battery management system BMS of the energy storage battery pack is dynamically adjusted by the control unit through the IGBT controller to send a control signal PWM to control the discharge of IGBT T-d. The corresponding duty cycle is dynamically adjusted within the maximum power threshold of the system. Meet the energy input requirements of the DC side of the DC-AC inverter device PCS;

Step S5: When the status type of multiple energy storage battery banks is the simultaneous charge-discharge state:

that is, when the PV photovoltaic power generation source is generating power normally and the DC-AC inverter device PCS outputs power to the power grid and works at the same time, the control unit detects The voltage Vi and current Ii of the DC power generation power input port and the voltage Vo and current Io data of the DC adjustment power supply output port as well as the charge-discharge capacity parameters uploaded by the battery management system BMS of the energy storage battery pack, according to the output-input power difference, that is $\Delta P = Po - Pi$, while adjusting the duty cycle of the control signal PWM of the forward charge control IGBT T-ci and the discharge control IGBT T-d. When the output power Po is greater than the input power Pi, the energy storage battery pack BAT participates in discharging. When the output When the power Po is less than the input power Pi, the energy storage battery pack BAT is charged. When the output power Po is equal to the input power Pi, the energy storage battery pack BAT works in a critical state to perform voltage clamping and dynamic energy compensation;

Step S6: Return to step S1 to complete the multi-energy storage battery control cycle.

In some embodiments, after step 5, it also includes: when the voltage Vi of the input port of the DC power supply is greater than the voltage Vo of the output port of the DC adjustment power supply, and if the output power Po is less than the input power Pi at this time, input—The output pass-through and reverse isolation diode D4 will be in a critical conduction state, and part of the electric energy will be directly supplied to the DC-AC inverter device PCS. The excess PV photovoltaic power generation power will be absorbed by the energy storage battery pack BAT, but the PV photovoltaic power generation power supply will be no-loaded. The peak voltage should be controlled within the voltage range set on the DC side of the DC-AC inverter device PCS; when the output power Po is greater than the input power Pi, due to the boosting effect of the discharge circuit, the input-output direct and reverse isolation diode D4 is cut off, the energy storage battery pack BAT participates in the charge-discharge process and buffers changes in electrical energy.

In some embodiments, after step 5, it also includes when the external power grid power consumption is less than the set threshold, according to the capacity state SOC and capacity control strategy of the energy storage battery pack, the IGBT controller initiates reverse charging control of the IGBT. T-co works and absorbs and stores electric energy from the power grid through the DC-AC inverter device PCS reverse rectification circuit to achieve the purpose of improving energy storage efficiency.

In some embodiments, when multiple energy storage battery groups are in the standby state in step S2, the forward charge control IGBT T-ci, the discharge control IGBT T-d, and the reverse charge control IGBT T-co stop working.

In some embodiments, the gates of the forward charge control IGBT T-ci, the discharge control IGBT T-d, and the reverse charge control IGBT T-co are respectively connected to corresponding IGBT controllers.

Figure 3:
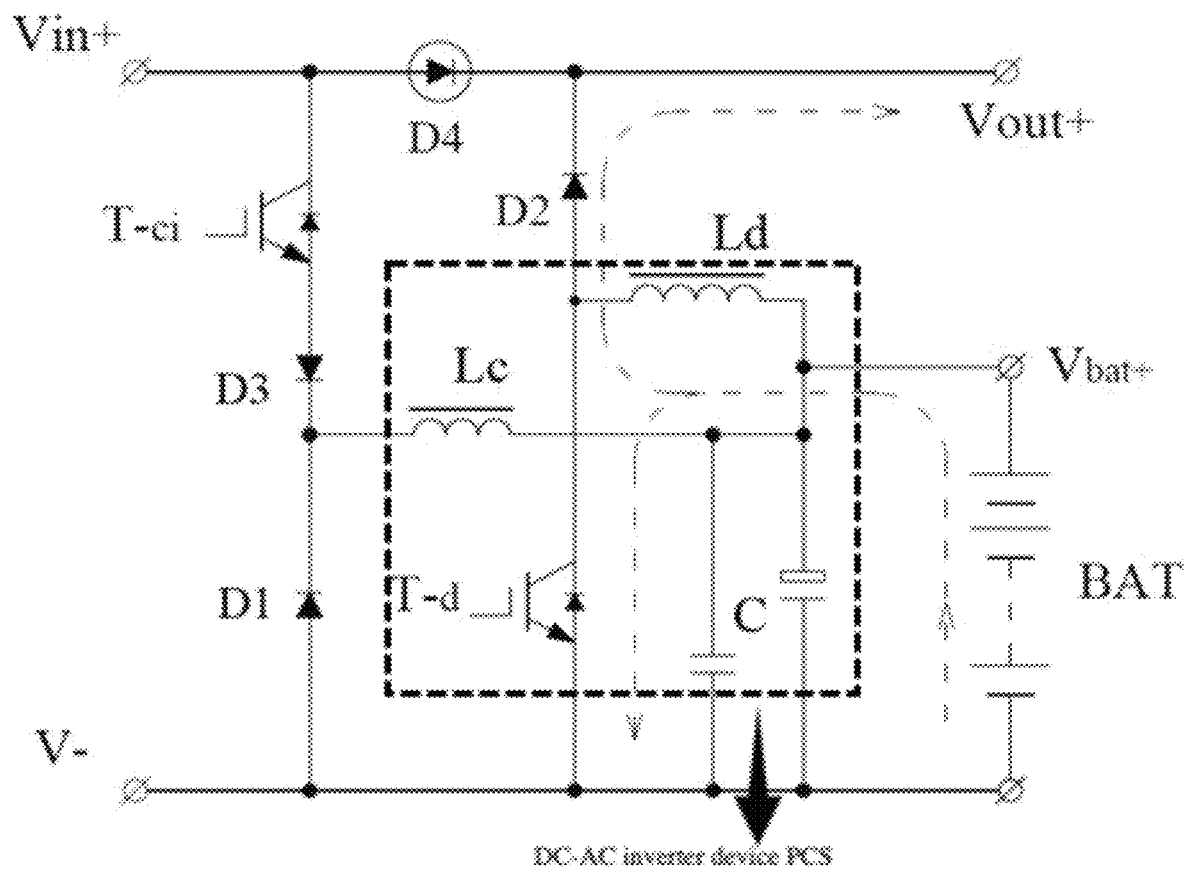
FIG. 3 is a battery pack independent discharge state diagram of the DC power conversion device based on the battery pack control method based on light intensity and battery status.
Figure 4:
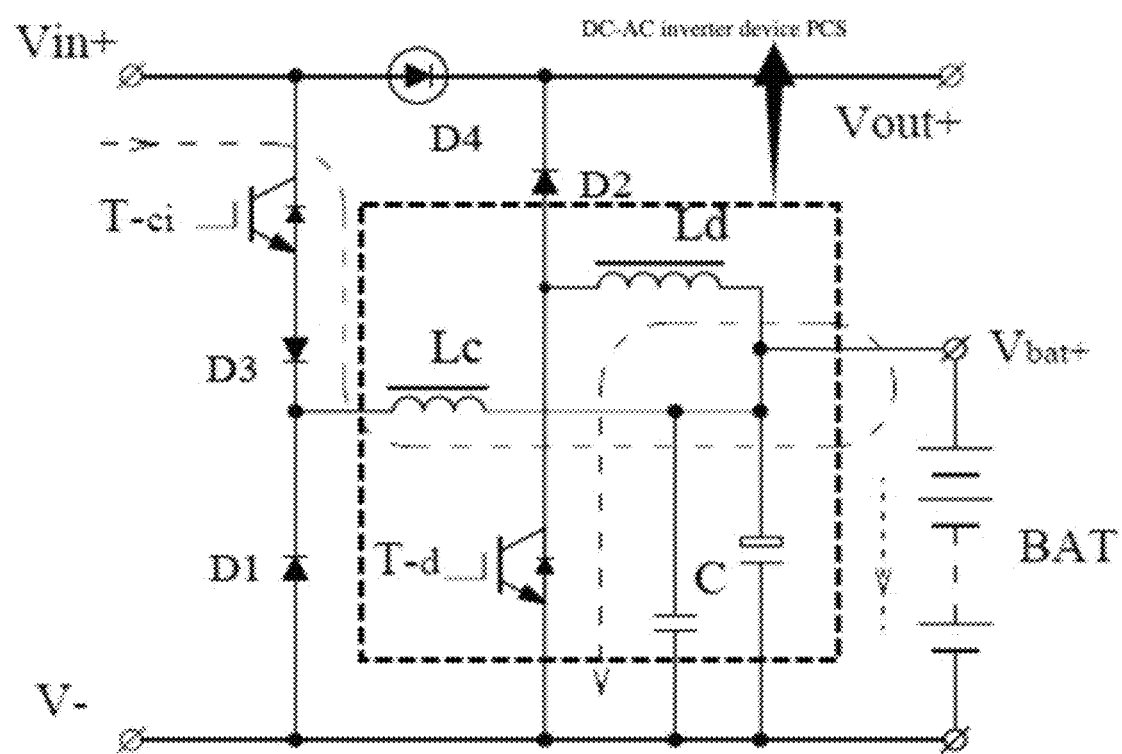
FIG. 4 is a state diagram of the energy storage battery pack BAT participating in charging in the DC power conversion device based on the battery pack control method based on light intensity and battery status.
Figure 5:
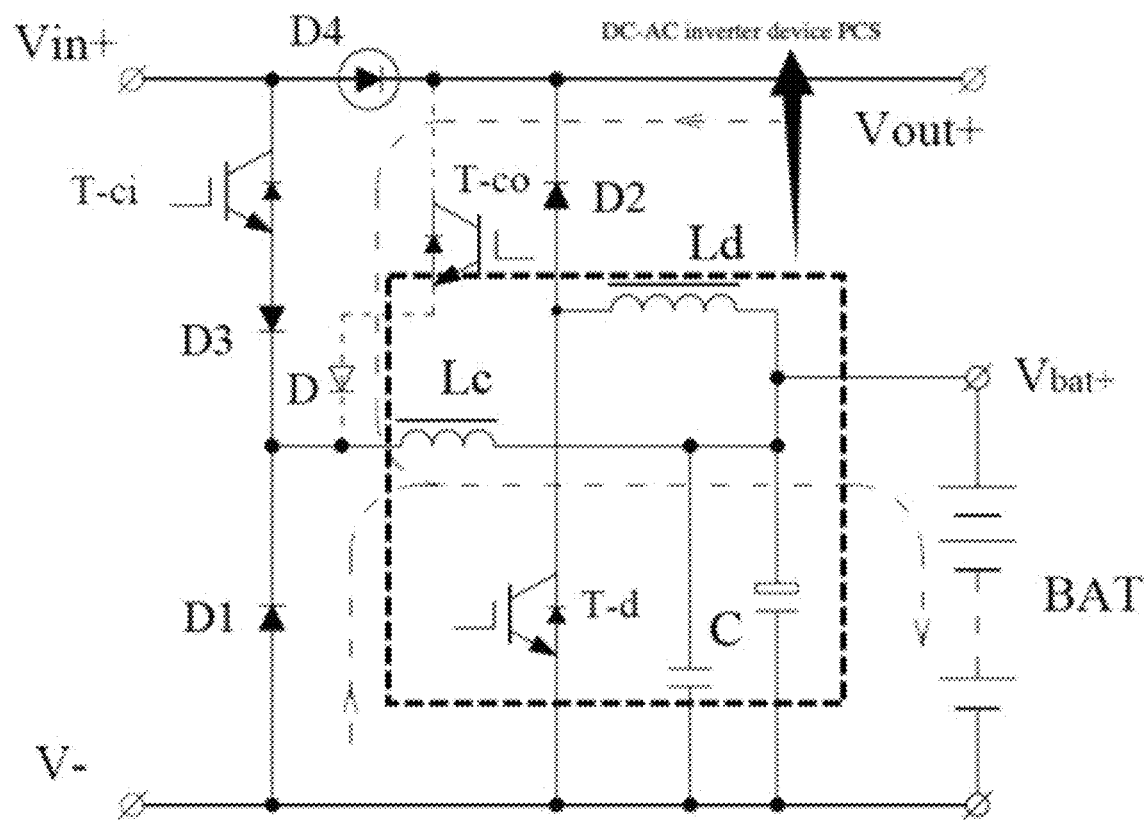
FIG. 5 is a reverse independent charging state diagram of the output side of the DC power conversion device based on the battery pack control method based on light intensity and battery status.
Figure 6:
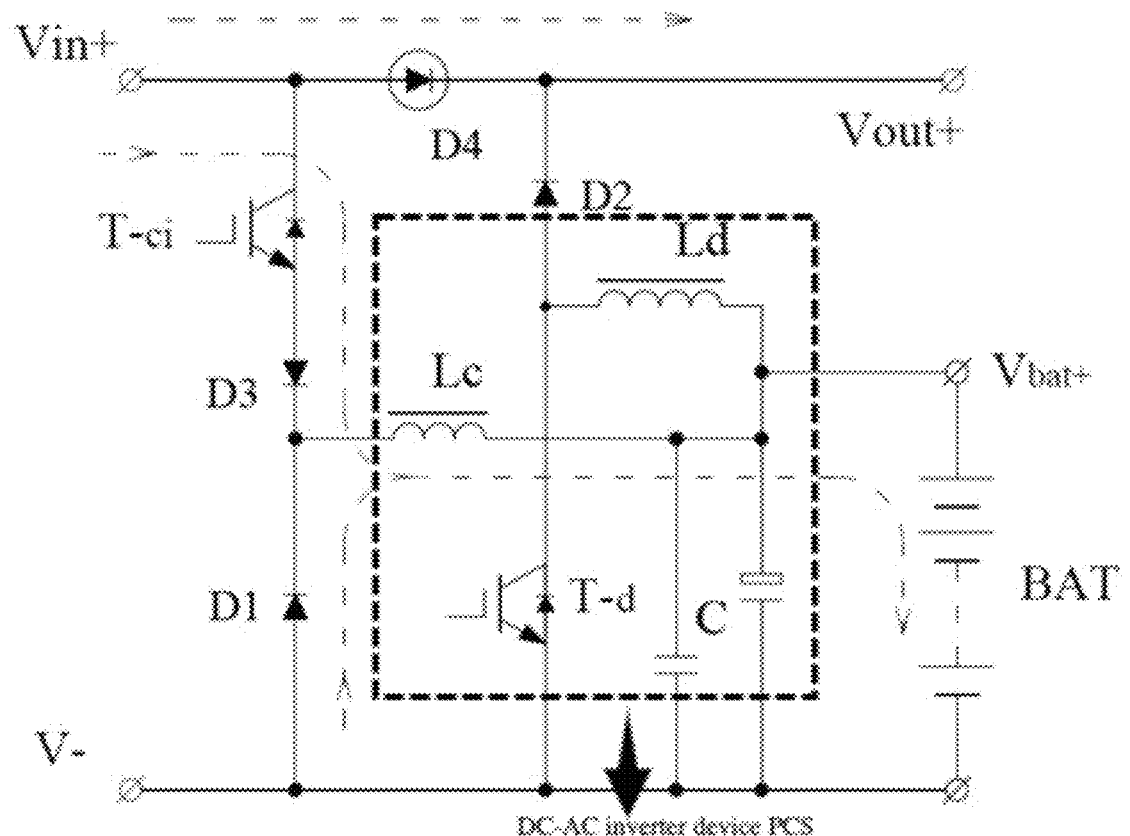
FIG. 6 is a diagram of the direct current power conversion device's direct current power conversion device and battery pack simultaneous charging state diagram based on the battery pack control method based on light intensity and battery status.
Figure 7:
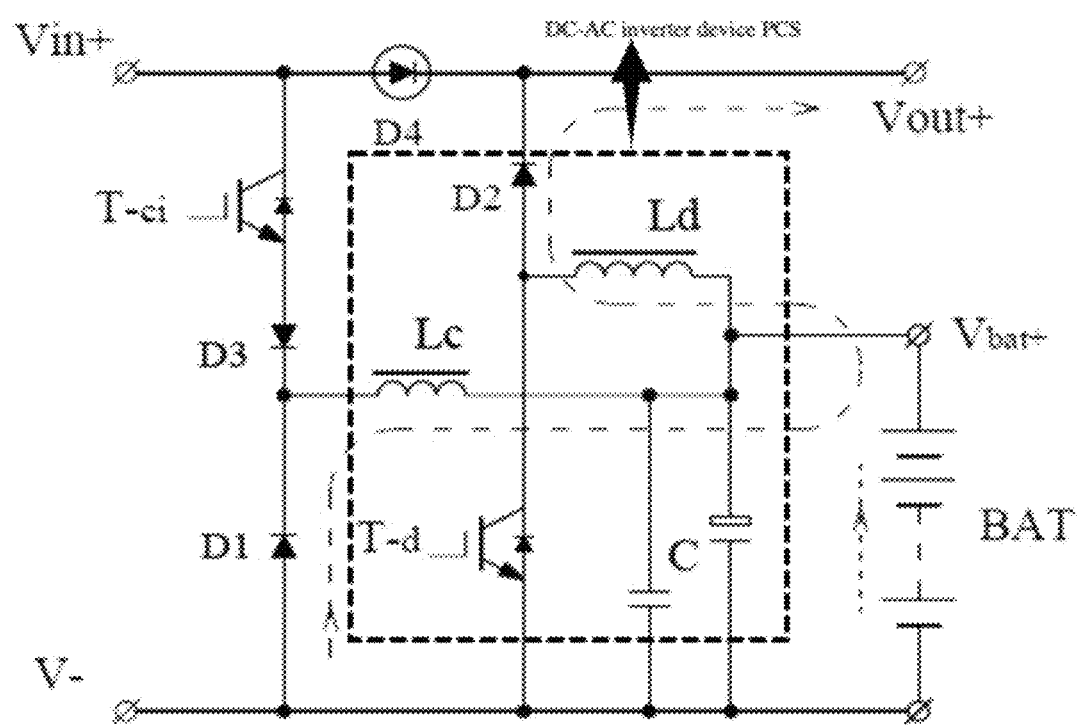
FIG. 7 is a state diagram of the energy storage battery pack BAT participating in discharge in the DC power conversion device based on the battery pack control method based on light intensity and battery status.
Figure 8:
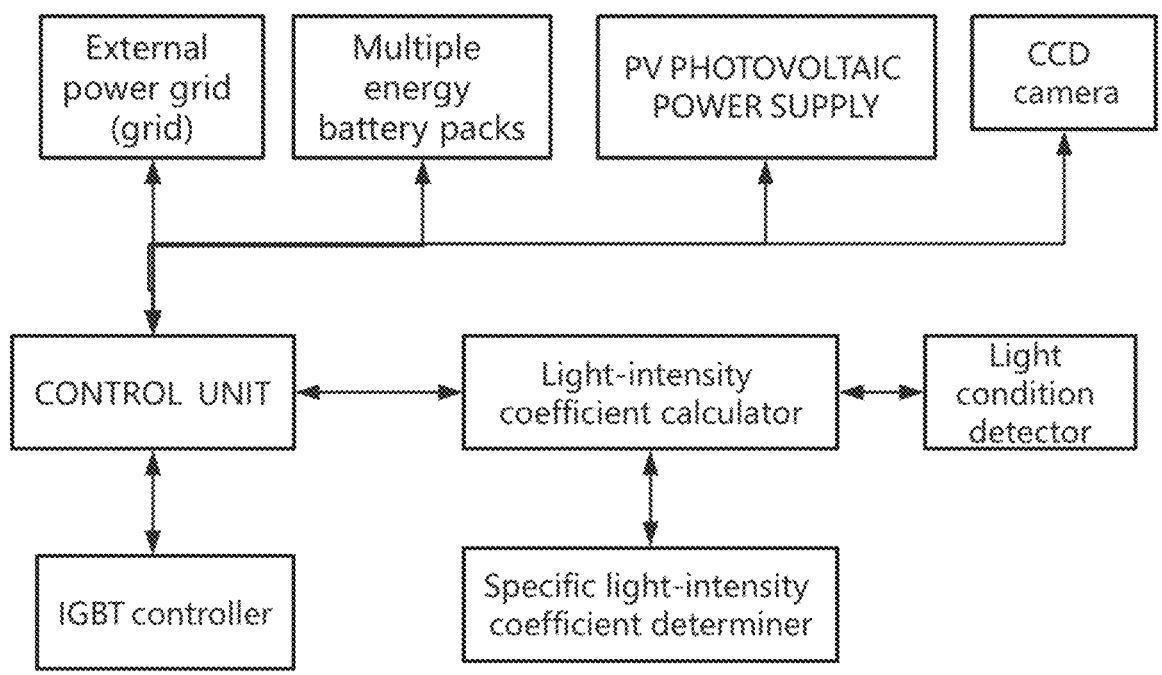
FIG. 8 is System block diagram illustrating a photovoltaic-battery hybrid power supply and light-intensity-based control architecture according to an embodiment of the present disclosure.

When the energy storage battery pack is normally online, the forward charge control IGBT (insulated gate bipolar transistor) T-ci and the discharge control IGBT T-d can work independently in time sharing or at the same time, while the reverse charge control IGBT T-d co can only work alone when there is no input power at the DC power input port Vin+ and independent energy storage is required. They all operate together under the process set by the Control Unit. When outputting electric energy (including isolated grid operation), after the control unit detects the changes in the voltage Vo and current Io of the DC regulated power supply output port, it determines the load power demand of the DC-AC inverter device PCS at this time and the energy storage battery at this time. The discharge capacity SOP given by the battery management system BMS of the group is dynamically adjusted by the control unit through the IGBT Driver (IGBT controller) to send the control signal PWM to control the discharge of IGBT T-d. The corresponding duty cycle is adjusted to meet the requirements within the maximum allowable power range of the system. Energy input requirements on the DC side of the DC-AC inverter device PCS. At this time, the DC power conversion device is in the independent discharge state of the battery pack, as shown in FIG. 3. The arrow in the figure indicates the current direction. When the new energy power generation and DC-AC inverter device PCS work at the same time, the control unit detects the voltage Vi and current Ii of the DC power generation power input port and the voltage Vo and current Io data of the DC adjustment power supply output port as well as the energy storage battery pack. The charge-discharge capacity parameters uploaded by the battery management system BMS, according to the output-input power difference, simultaneously adjust the duty cycle of the control signal PWM of the forward charge control IGBT T-ci and the discharge control IGBT T-d. When the output power Po is greater than When the power Pi is input, the energy storage battery pack BAT participates in discharging, and its state diagram is shown in FIG. 7. The arrow in the figure is the current direction. When the output power Po is less than the input power Pi, the energy storage battery pack BAT participates in charging, and its state diagram As shown in FIG. 4, the arrow in the figure indicates the direction of the current. When the output power Po is equal to the input power Pi, the energy storage battery pack BAT works in a critical state and mainly plays the role of voltage clamping and dynamic energy compensation. When the external power grid is in special periods such as low power consumption, when there is no new energy generation and no need to output power, the IGBT controller (IGBT Driver) can initiate reverse charging according to the capacity state SOC and capacity control strategy of the energy storage battery pack. Control the operation of IGBT T-co and absorb and store electric energy from the power grid through the PCS reverse rectification circuit of the DC-AC inverter device to achieve the purpose of efficient energy storage during trough periods and reduce power waste. At this time, the DC power conversion device is reverse independent on the output side. The charging state is shown in FIG. 5. The arrows in the figure indicate the direction of the current. No matter what the working conditions are, the DC-AC inverter device PCS always operates online in one direction without the need for bidirectional conversion, which can improve the system's responsiveness. When the voltage Vi at the input port of the DC power supply is greater than the voltage Vo at the output port of the DC regulating power supply, and if the output power Po is less than the input power Pi at this time, the input-output direct and reverse isolation diode D4 will be in critical conduction. state, part of the electric energy is directly supplied to the DC-AC inverter device PCS, and the excess PV new energy is absorbed by the energy storage battery pack BAT. At this time, the DC power conversion device is in the pass-through state and the battery pack is charged at the same time, as shown in FIG. 6. In the figure The arrow shows the direction of the current. When the output power Po is greater than the input power Pi, due to the boosting effect of the discharge circuit, the input-output direct and reverse isolation diode D4 will be cut off, and the energy storage battery pack BAT will intervene in the charge-discharge process in a timely manner to buffer the electric energy. Variety.

In some embodiments, when the energy storage battery group access ports Vbat+ of several DC power conversion devices are independently connected to different energy storage battery groups, the battery management system of each energy storage battery group separately controls the respective energy storage battery group to ensure that The entire system works together, but the monitoring strategies of each battery management system are slightly different according to the type of energy storage battery pack. Table 1 is the working condition logic table of the DC power conversion device. "1" in the table means working and "0" means Stop, "↑" means to store energy, "↓" means to release energy.

2. Independent charging process control (Table 1—NO.2): Forward charging control IGBT T-ci, charging storage inductor Lc, charging freewheeling diode D1 work in Buck step-down mode, and the control unit Control Unit detects DC After the voltage Vi and current Ii of the power generation power input port change, according to the state of charge SOC and maximum charging capacity SOP given by the energy storage battery pack BMS at this time, the control unit sends a forward charging control IGBT T-ci signal through the IGBT Driver. The control signal PWM dynamically adjusts and suppresses the charging power by adjusting its duty cycle, so that the battery pack can collect and store new energy safely, stably, quickly and efficiently.

3. Independent discharge (including isolated grid operation) process control (Table 1—NO.3): The discharge control IGBT T-d, the discharge storage inductor Ld, and the discharge freewheeling diode D2 work in the Boost boost

TABLE 1

| NO. | T-ci | E-$_{Lc}$ | D1 | E$_{bat}$ | T-d | E-$_{Ld}$ | D2 | V$_{in}$-V$_{out}$ | D4 | state | Working condition description | |
|---|---|---|---|---|---|---|---|---|---|---|---|---|
| 1 | 0 | — | 0 | — | 0 | — | 0 | <0  V$_{in}$ ≤ V$_{bat}$ | 0 | standby | Battery isobaric standby | V$_{out}$ = V$_{bat}$ Active standby |
|   | 0 | — | 0 | — | 0 | — | 0 | ≥0  V$_{in}$ > V$_{bat}$ | 1 |  | Pass-through standby special case | Or V$_{out}$ = V$_{in}$ |
| 2 | 1 | ↑ | 0 | ↑ |   | 0 |   | indefinite | 0 | Charge | LcStore energy | Buck charging |
|   | 0 | ↓ | 1 | ↑ |   |   |   |  |   |   | Lcrelease energy | Buck mode (V$_{in}$ − V$_{bat}$) >0 |
| 3 |   | 0 |   | ↓ | 1 | ↑ | 0 | ≤0 | 0 | discharge | LdStore energy | Boost discharge |
|   |   | ↓ |   |   | 0 | ↓ | 1 |  | 0 |   | Ldrelease energy | Boost mode (V$_{out}$ − V$_{bat}$) |
| 4 | 1 | ↑ | 0 | un-certain | 1 | ↑ | 0 | ≤0 | 0 | LcLdStore energy | battery voltage clamp | Charge and discharge simul-taneously |
|   | 0 | ↓ | 1 | un-certain | 0 | ↓ | 1 |  |  | LcLdrelease energy | Battery charge = input − output power |  |
| 5 | 1/0 | ↑/↓ | 0/1 | ↑ | 0 | — | 0 | >0 | 1 | Input through discharge Battery charge = input − output | special case | Thru output/ battery pack charging |

A brief explanation of Table 1 is given below:

1. Standby state (Table 1—NO.1): All IGBTs (T-ci, T-d, T-co) stop working, and when there is insufficient external light or no PV photovoltaic power source, the DC side of the DC-AC inverter device PCS The standby voltage is equal to the battery pack voltage, that is, Vout=Vbat; if there is sufficient external light and the PV power generation is normal, the DC-AC inverter PCS is passed through the input-output pass-through and reverse isolation diode D4, and the DC side standby voltage is equal to the photovoltaic power generation. The power supply voltage is Vout=Vin. The prerequisite for the standby state of the DC power conversion device is that the DC-AC inverter device PCS must also be in the standby state, otherwise there will be risks.

mode, and the control unit detects After adjusting the changes in voltage Vo and current Io at the DC power supply output port, according to the load power demand of the DC-AC inverter device PCS at this time and the discharge capacity SOP given by the battery management system BMS of the energy storage battery pack at this time, The control unit sends out the control signal PWM for discharging control IGBT T-d through the IGBT Driver (IGBT controller) and dynamically adjusts the corresponding duty cycle to meet the energy input requirements of the DC side of the DC-AC inverter device PCS within the maximum allowable power range of the system.

4. Simultaneous charge-discharge process control (Table 1—NO.4): When new energy sources such as photovoltaic PV generate electricity normally and the DC-AC inverter device PCS outputs power to the grid and works at the same time, the control unit detects the DC power source. The voltage Vi and current Ii of the input port and the voltage Vo and current Io data of the output port of the DC adjustment power supply and the charge-discharge capacity parameters uploaded by the battery management system BMS of the energy storage battery pack are based on the output-input power difference, that is, ΔP=Po−Pi, while adjusting the duty cycle of the control signal PWM of the forward charge control IGBT T-ci and the discharge control IGBT T-d. When the output power Po is greater than the input power Pi, the energy storage battery pack BAT participates in the discharge. When the output power Po is less than When the input power Pi is used, the energy storage battery pack BAT participates in charging. When the output power Po is equal to the input power Pi, the energy storage battery pack BAT works in a critical state and mainly functions as voltage clamping and dynamic energy compensation, but there must be a battery pack connected. In order to ensure the smooth and safe operation of the DC-B-DC circuit and output power, the safety priority of all control units complies with BMS>Control Unit>PCS>EMS (Energy Management System).

5. Special working condition control (Table 1—NO.5): When the voltage Vi at the input port of the DC power supply is greater than the voltage Vo at the output port of the DC adjustment power supply, if the output power Po is less than the input power Pi at this time, The input-output pass-through and reverse isolation diode D4 will be in a critical conduction state, and part of the electric energy will be directly supplied to the DC-AC inverter device PCS. The excess PV new energy will be absorbed by the energy storage battery pack BAT, but the no-load peak voltage of the PV should Control within the allowable voltage range of the DC side of the DC-AC inverter device PCS, which must be considered when building the system; when the output power Po is greater than the input power Pi, due to the boosting effect of the discharge circuit, the input-output direct and reverse The isolation diode D4 will cut off, and the energy storage battery pack BAT will intervene in the charge-discharge process in a timely manner to buffer the changes in electric energy.

6. When the external power grid is in special periods such as low power consumption, when there is no new energy generation and no need to output power (such as at night, no wind, and low power consumption), the SOC and capacity control can be based on the capacity status of the energy storage battery pack. Strategy, the IGBT controller (IGBT Driver) starts reverse charging to control the operation of IGBT T-co (the working condition is the same as the independent charging process No. 2), and absorbs and stores electric energy from the power grid through the DC-AC inverter device PCS reverse rectification circuit to To achieve the purpose of improving energy storage efficiency.

In some embodiments, the maximum charging capacity SOP1 and the maximum discharging capacity SOP2 are obtained in the following manner. Step S11 selects multiple energy storage battery groups and detects their conditions at different temperatures, polarization voltages, durations, SOC, and SOH values; Step S12: Perform constant voltage discharge on multiple energy storage battery packs, record the constant voltage UcL and the current at the end of discharge of the battery in each charge state; Step S13: Perform constant voltage charging on the battery, record the constant voltage UcW and each charge state; Step S14: Perform constant power discharge on the battery, and determine the maximum discharge power of the battery under different charge states; Step S15: Perform constant power charging on the battery, and determine and obtain the battery's maximum discharge power under different charge states. Maximum charging power; input the parameters in steps S11, S12, S13, S14, and S15 into the convolutional neural network training to obtain the convolutional neural network model of the training number, and input the status of the current energy storage battery pack into the trained convolutional neural network Network model, obtain the maximum charging capacity SOP1 and the maximum discharge capacity SOP2.

In some embodiments, the illumination situation is detected by judging the illumination intensity through the color illumination intensity coefficient value of the photographed picture. The specific illumination intensity coefficient value is specifically expressed as:

$$\gamma = k_1 R + k_2 G + k_3 B$$

R is the R channel value of the RGB image acquired by the CCD camera, G is the G channel value of the RGB image acquired by the CCD camera, and B is the B channel value of the RGB image acquired by the CCD camera. $k_1$, $k_2$, $k_3$ 分别 Represent the weight coefficients of the R channel value, G channel value, and B channel value respectively.

In some embodiments, the weight coefficients of the R channel value, G channel value, and B channel value are all 0.33 or 255.

The beneficial technical effects that can be achieved by the system of the present invention are as follows:

1. According to the state of charge SOC and maximum charging capacity SOP1 detected by the BMS of the energy storage battery pack, the control unit sends the control signal PWM for forward charging control IGBT T-ci through the IGBT controller, and dynamically adjusts it by adjusting its duty cycle, suppress charging power, allowing the battery pack to collect and store new energy safely, stably, quickly and efficiently 2. Make adaptive adjustments based on the detected lighting conditions; when the light intensity coefficient value is less than the set threshold or when there is no PV photovoltaic power supply working, the light intensity coefficient value is judged based on the color of the image, which greatly improves the accuracy of the judgment.

3. The maximum charging capacity SOP1 and the maximum discharging capacity SOP2 are obtained by training the convolutional neural network algorithm based on historical data, which greatly improves the accuracy.

4. According to the output-input power difference, that is, ΔP=Po−Pi, adjust the duty cycle of the control signal PWM of the forward charging control IGBT T-ci and the discharge control IGBT T-d at the same time. When the output power Po is greater than the input power Pi, The energy storage battery pack BAT participates in discharging. When the output power Po is less than the input power Pi, the energy storage battery pack BAT charges. When the output power Po is equal to the input power Pi, the energy storage battery pack BAT works in a critical state, realizing voltage clamping. Bit and dynamic energy compensation improves the power control adaptive capability.

The above is a detailed introduction to a battery pack control method based on light intensity and battery status. This article uses specific examples to illustrate the principles and implementation methods of the present invention. The description of the above embodiments is only used to help understand the present invention. The core idea of Limitations of Invention.

What is claimed is:

1. A battery pack control method in a mixed storage state based on light intensity, which is characterized by including the following steps:
S1: detecting a status of multiple energy storage battery packs in real time
wherein, if the status of multiple energy storage battery packs is in a standby state, go to S2;
wherein, if the status of multiple energy storage battery packs is in a charging state, go to S3;
wherein, if the status of multiple energy storage battery packs is in a discharge state, go to S4;
wherein, if the status of multiple energy storage battery packs is in a simultaneous charge-discharge state, go to S5;
S2: detecting a lighting situation by calculating a light intensity coefficient value and a set threshold, and determining whether a PV photovoltaic power generation power supply is working, and adjusting a DC side standby voltage of a DC-AC inverter device PCS, wherein after S2, go to S6:
S3: sending, via a control unit, a control signal PWM for forward charging control a IGBT T-ci through an IGBT controller, and dynamically adjusting and suppressing a charging power by adjusting a duty cycle,
wherein after S3, go to S6;
S4: sending, via the control unit, the duty cycle corresponding to the control signal PWM for discharging control a IGBT T-d through the IGBT controller, and dynamically adjusting the DC side of the DC-AC inverter device PCS,
wherein after S4, go to S6;
S5: based on the size of an output power Po and an input power Pi, adjusting the charging or discharging of an energy storage battery pack BAT,
wherein after S5, go to S6;
S6: returning to S1.

2. The battery pack control method in a mixed storage state based on light intensity according to claim 1, characterized in that detecting the lighting situation in S2 further comprises calculating the light intensity coefficient value through the color of a RGB image of the energy storage battery pack BAT in real time, wherein the light intensity coefficient value is expressed as:

$$\gamma = k_1 R + k_2 G + k_3 B$$

wherein R is a R channel value of the RGB image acquired by a CCD camera, G is a G channel value of the RGB image acquired by the CCD camera, and B is a B channel value of the RGB image acquired by the CCD camera,
wherein $k_1$, $k_2$, $k_3$ represent the R channel value, the G channel value, and the B channel value respectively as weight coefficients, wherein the larger the light intensity coefficient value, the stronger light intensity.

3. The battery pack control method in a mixed storage state based on light intensity according to claim 2, further characterized in that the weight coefficients of the R channel value, the G channel value, and the B channel value are all 0.33 or 255.

4. The battery pack control method in a mixed storage state based on light intensity according to claim 1, characterized in that S5 further comprises:

wherein, if a voltage Vi of a DC power supply input port is greater than a DC adjustment power supply output, and for a port voltage Vo, if the output power Po is less than the input power Pi at this time, an input-output pass-through and reverse isolation diode D4 will be in a critical conduction state, and electric energy will be directly supplied to the DC-AC inverter device PCS, and the remaining power of the PV photovoltaic power generation power supply is absorbed by the energy storage battery pack BAT, but a no-load peak voltage of the PV photovoltaic power generation power supply is controlled within a voltage range set by the DC side of the DC-AC inverter device PCS; and
wherein, if the output power Po is greater than the input power Pi at this time, due to a boosting effect of a discharge circuit, an input-output direct and reverse isolation diode D4 is cut off, and the energy storage battery pack BAT participates in charging and discharging to buffer the changes in electric energy.

5. The battery pack control method in a mixed storage state based on light intensity according to claim 1, characterized in that S5 further comprises:
wherein, if power consumption of an external power grid is less than the set threshold and there is no PV at this time, and during photovoltaic power generation, according to a capacity state SOC of the energy storage battery pack, the IGBT controller starts reverse charging to control the operation of a IGBT T-co, and absorbs and stores electric energy from the external power grid through the DC-AC inverter device PCS reverse rectification circuit to improve energy storage.

6. The battery pack control method in a mixed storage state based on light intensity according to claim 1, characterized in that S2 further comprises:
wherein, if multiple energy storage battery packs are in a standby state, forward charging control IGBT T-ci, discharge control IGBT T-d, and reverse charge control IGBT T-co stop working.

7. The battery pack control method in a mixed storage state based on light intensity according to claim 6, further characterized in that the gates of the forward charge control IGBT T-ci, the discharge control IGBT T-d, and the reverse charge control IGBT T-co are respectively connected to corresponding IGBT controllers.

8. The battery pack control method in a mixed storage state based on light intensity according to claim 1, characterized in that S5 further comprises:
wherein, if the state type of the multiple energy storage battery packs is the simultaneous charge-discharge state such that the PV photovoltaic power source is generating power normally and the DC-AC inverter device PCS is outputting power to an external power grid and working at the same time, the control unit detects a voltage Vi and a current Ii of a DC power source input port and a voltage Vo and a current Io data of the DC adjustment power supply output port as well as charge-discharge capacity parameters uploaded by the battery management system BMS of the energy storage battery pack,
wherein according to the output, the output the input power difference is ΔP=Po−Pi,
wherein a duty cycle of the control signal PWM of a forward charge control IGBT T-ci and a discharge control IGBT are simultaneously adjusted,
wherein if the output power Po is greater than the input power Pi, the energy storage battery pack BAT discharges, wherein if the output power Po is less than the input power Pi, the energy storage battery pack BAT charges, and wherein if the output power Po equals the input power Pi, the energy storage battery pack BAT works in a critical state to perform voltage clamping and dynamic energy compensation.

9. The battery pack control method in a mixed storage state based on light intensity according to claim 1, characterized in that S4 further comprises:

wherein, if the state type of multiple energy storage battery packs is a discharge state, the discharge control IGBT T-d, the discharge storage inductor Ld, and the discharge freewheeling diode D2 work in a boost mode, wherein after the control unit detects the changes in the voltage Vo and current Io of the DC adjustment power supply output port according to the DC-AC inverter device PCS, the load power demand at this time and the maximum discharge capacity SOP2 given by the battery management system BMS of the energy storage battery pack at this time, are dynamically adjusted by the control unit through the IGBT controller to send the control signal PWM to control the discharge of IGBT T-d; and wherein the corresponding duty cycle is dynamically adjusted to meet the energy input requirements of the DC side of the DC-AC inverter device PCS within the maximum power threshold of the system.

10. The battery pack control method in a mixed storage state based on light intensity according to claim 1, characterized in that S3 further comprises:

wherein, if the state type of the multiple energy storage battery packs is the forward charging state, the charging control IGBT T-ci, the charging storage inductor Lc, and the charging freewheeling diode D1 work in a buck step-down mode;

wherein after the control unit detects the changes in the voltage Vi and current Ii of the DC power supply input port, the control unit controls the energy storage battery according to the energy storage battery pack; and wherein based on the state of charge SOC and a maximum charging capacity SOP1 detected by the BMS, the control unit sends the control signal PWM for forward charging control IGBT T-ci through the IGBT controller, and dynamically adjusts and suppresses the charging power by adjusting the duty cycle.

11. The battery pack control method in a mixed storage state based on light intensity according to claim 10, further characterized as follows:

the maximum charging capacity SOP1 or/and the maximum discharging capacity SOP2 are obtained by selecting multiple energy storage battery packs and detecting their values at different temperatures, polarization voltages, durations, SOC, and SOH; performing constant voltage discharge on multiple energy storage battery packs, and recording the constant voltage UcL and the discharge of the batteries under each charge state;

the current is obtained by charging the battery with constant voltage, recording the constant voltage UcW and the current at the end of charging of the battery in each state of charge; discharging the battery with constant power, and determining the current of the battery under different charge states;

the maximum discharge power is obtained by charging the battery at constant power, and determining the maximum charging power of the battery under different charge states; and inputting the above parameters into a convolutional neural network training to obtain the training number, wherein the convolutional neural network model inputs the current state of the energy storage battery pack into the trained convolutional neural network model to obtain the maximum charging capacity SOP1 and the maximum discharge capacity SOP2.

12. The battery pack control method in a mixed storage state based on light intensity according to claim 1, characterized in that S2 further comprises:

wherein, if the light intensity coefficient value is less than the set threshold or there is no PV photovoltaic power generation source working when the DC-AC inverter device PCS DC side standby voltage is equal to the battery pack voltage, such that Vout=Vbat, and if the light intensity coefficient value is greater than the set threshold and the PV photovoltaic power generation power is normal through the input-output direct and reverse directly through the DC-AC inverter device PCS to the isolation diode D4, the DC side standby voltage of the PCS is equal to the photovoltaic power supply voltage, such that Vout=Vin.

* * * * *